(12) United States Patent
Hoshino et al.

(10) Patent No.: US 10,266,128 B2
(45) Date of Patent: Apr. 23, 2019

(54) ATTACHMENT STRUCTURE FOR HEAT INSULATING COVER

(71) Applicant: MAZDA MOTOR CORPORATION, Hiroshima (JP)

(72) Inventors: Tsukasa Hoshino, Hiroshima (JP); Kenji Sugasaki, Hiroshima (JP); Kazumi Okamura, Hatsukaichi (JP); Makoto Shinhama, Hiroshima (JP); Masanobu Koutoku, Higashihiroshima (JP); Ryo Yamamoto, Hiroshima (JP); Yukiya Tanaka, Higashihiroshima (JP); Toshimichi Nishikawa, Nisshin (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/758,659

(22) PCT Filed: Mar. 8, 2017

(86) PCT No.: PCT/JP2017/009200
§ 371 (c)(1),
(2) Date: Mar. 8, 2018

(87) PCT Pub. No.: WO2017/169586
PCT Pub. Date: Oct. 5, 2017

(65) Prior Publication Data
US 2018/0244216 A1     Aug. 30, 2018

(30) Foreign Application Priority Data

Mar. 29, 2016   (JP) ................................. 2016-066449

(51) Int. Cl.
*B62D 25/10*      (2006.01)
*B60R 13/08*      (2006.01)
(Continued)

(52) U.S. Cl.
CPC .......... *B60R 13/0838* (2013.01); *B60K 11/04* (2013.01); *B60K 11/06* (2013.01);
(Continued)

(58) Field of Classification Search
CPC .... B60R 13/0838; B62D 25/10; B62D 25/105
See application file for complete search history.

(56) References Cited

U.S. PATENT DOCUMENTS

2009/0179460 A1*  7/2009  Peterson ............. B60R 13/0861
                                                              296/193.11
2012/0049664 A1   3/2012  Yokoyama et al.
(Continued)

FOREIGN PATENT DOCUMENTS

JP    2004-132219 A    4/2004
JP    2005-155599 A    6/2005
(Continued)

OTHER PUBLICATIONS

International Search Report issued in PCT/JP2017/009200; dated May 23, 2017.

*Primary Examiner* — Bryan A Evans
(74) *Attorney, Agent, or Firm* — Studebaker & Brackett PC (57) ABSTRACT

A heat insulating cover (cylinder-head-side heat insulating cover (30)) includes a top wall (31) and first side walls (32). The top wall (31) covers a top surface of an engine (1) that is a surface of an upper portion of the engine (1). The first side walls (32) cover respective upper portions of both side surfaces of the engine (1) in a vehicle width direction. A portion of the heat insulating cover closer to the rear of the vehicle is provided with a hinge mechanism (36) vertically rotatably supporting the upper portion of the heat insulating cover including the top wall (31). The upper portion of the heat insulating cover can be rotated, with the hinge mechanism (36) as a fulcrum, between a closed position where the (Continued)

engine (1) is shielded and an open position where the engine (1) is visible.

5 Claims, 6 Drawing Sheets

(51) Int. Cl.
    *B60K 11/04*      (2006.01)
    *B60K 11/06*      (2006.01)
    *F02B 77/11*      (2006.01)
    *B62D 25/08*      (2006.01)

(52) U.S. Cl.
    CPC ........ *B60R 13/0876* (2013.01); *B62D 25/084* (2013.01); *F02B 77/11* (2013.01); *B62D 25/081* (2013.01)

(56) References Cited

U.S. PATENT DOCUMENTS

| | | |
|---|---|---|
| 2013/0146376 A1 | 6/2013 | Nam et al. |
| 2017/0152818 A1* | 6/2017 | Newman .............. F02M 35/104 |
| 2018/0056890 A1* | 3/2018 | Nola ................... B60R 13/0838 |

FOREIGN PATENT DOCUMENTS

| | | |
|---|---|---|
| JP | 2012-051386 A | 3/2012 |
| JP | 2013-119384 A | 6/2013 |

\* cited by examiner

ATTACHMENT STRUCTURE FOR HEAT INSULATING COVER

TECHNICAL FIELD

The present disclosure relates to an attachment structure for a heat insulating cover.

BACKGROUND ART

Heat insulating covers for heat-insulating an engine disposed in an engine compartment provided in the front side of a vehicle are known in the art. Patent Document 1 discloses a heat insulating cover including an engine compartment encapsulation member surrounding the upper portion of a power train configured as an assembly of an engine and a transmission in an engine compartment. The engine compartment encapsulation member includes a top cover for covering the upper portion of the engine compartment, and right and left side covers for covering side surfaces of the engine compartment, the top cover and the left and right side covers being integrally formed with one another. A rear cover is integrally formed with the top cover and the left and right side covers at rear edges of these covers closer to the rear of the vehicle, and covers a rear surface of the engine compartment. The engine compartment encapsulation member has an open surface closer to the front of the vehicle to introduce and discharge air.

CITATION LIST

Patent Document

PATENT DOCUMENT1: Japanese Unexamined Patent Publication No. 2013-119384

SUMMARY OF THE INVENTION

Technical Problem

In a case where the heat insulating cover is disposed so as to shield the upper portion of the engine compartment as disclosed in Patent Document 1, the heat insulating cover has to be detached from the vehicle body during engine maintenance.

In the heat insulating cover disclosed in Patent Document 1, the top cover and the side covers are integrally formed with one another. Thus, when the heat insulating cover is detached from the vehicle body, it is necessary to lift the heat insulating cover to detach the entire cover from the vehicle body.

However, in a situation where the engine is disposed in the engine compartment provided in the front of the vehicle, due to a bonnet above the heat insulating cover, time and effort are required to detach the heat insulating cover so that the cover does not abut on the bonnet, and to attach the cover again after the maintenance. On top of that, a space has to be provided to store the detached heat insulating cover. This deteriorates work efficiency of the maintenance.

An opening may be provided in the top cover of the heat insulating cover to perform maintenance without detaching the heat insulating cover from the vehicle body. However, hot air may be discharged from the opening, and thus, providing such an opening may result in degradation of heat insulating performance of the heat insulating cover.

The present disclosure is conceived in view of the above problems, and intends to improve work efficiency in maintenance of an engine without deteriorating heat insulating performance of a heat insulating cover.

Solution to the Problem

The present disclosure is directed to an attachment structure of a heat insulating cover for heat-insulating an engine housed in an engine compartment provided in a front of a vehicle, and closed/opened by a bonnet. The heat insulating cover includes: a top wall covering, and spaced apart from, an entire top surface of the engine that is a surface of an upper portion of the engine in a vertical direction; and side walls integrally formed with the top wall, each of the side walls covering, and spaced apart from, an upper portion of a corresponding one of side surfaces of the engine in a vehicle width direction. The attachment structure of the heat insulating cover includes a rear support provided in a portion of the heat insulating cover closer to the rear of the vehicle, and vertically rotatably supporting an upper portion of the heat insulating cover including the entire top wall. At least the portion of the heat insulating cover including the entire top wall functions as a rotator capable of being rotated, with the rear support as a fulcrum, between a closed position where the engine is shielded from above, and an open position where the top surface of the engine is visible from a position in front of the vehicle and a position above the vehicle.

This configuration allows for performing maintenance of the engine without detaching the heat insulating cover, thereby making it possible to improve work efficiency of the maintenance.

Specifically, the portion of the heat insulating cover closer to the rear of the vehicle is provided with the rear support vertically rotatably supporting the upper portion of the heat insulating cover including the entire top wall. The upper portion of the heat insulating cover including the entire top wall functions as a rotator configured to be able to be rotated, with the rear support as a fulcrum, between the closed position where the engine is shielded from above, and the open position where the top surface of the engine is visible from the position in front of the vehicle and the position above the vehicle. Thus, during the maintenance of the engine, the top surface of the engine can be viewed from the position in front of the vehicle and the position above the vehicle if the rotator is rotated to the open position with the rear support as a fulcrum. After the maintenance of the engine, the engine can be covered with the heat insulating cover so as to be shielded from above again if the rotator is rotated from the open position to the closed position. This allows for performing maintenance of the engine without detaching the entire heat insulating cover from the vehicle body, thereby making it possible to improve work efficiency of the maintenance.

The heat insulating cover does not have to be provided with, e.g., an opening for performing the maintenance of the engine. As a result, the heat insulating performance of the heat insulating cover is not degenerated.

Accordingly, this can improve work efficiency during the maintenance of the engine without deteriorating the heat insulating performance of the heat insulating cover.

In one embodiment of the attachment structure of the heat insulating cover, the heat insulating cover comprises an upper heat insulating cover including the top wall and an upper portion of the side wall, and a lower heat insulating cover including a lower portion of the side wall, the upper heat insulating cover being detachable from the lower heat insulating cover, the lower heat insulating cover is attached to a vehicle body of the vehicle, the upper heat insulating cover is attached to the vehicle body through the rear support, and functions as the rotator, and when the upper heat insulating cover is positioned at the closed position, the upper heat insulating cover abuts on the lower heat insulating cover such that no gap is formed between a lower edge of the upper heat insulating cover and an upper edge of the lower heat insulating cover.

According to this configuration, the heat insulating cover comprises the upper heat insulating cover including the top wall and the upper portion of the side wall, and the lower heat insulating cover including the lower portion of the side wall, the upper heat insulating cover being detachable from the lower heat insulating cover. The upper heat insulating cover functions as the rotator. Accordingly, if the upper heat insulating cover is rotated to the open position, the engine can be viewed from the position in front of the vehicle and the position above the vehicle.

When the rotator is rotated with the rear support as a fulcrum, the lower edge of the rotator closer to the front of the vehicle extends more forward in the longitudinal direction of the vehicle than the edge of the heat insulating cover closer to the front of the vehicle in the closed position does. It is necessary to provide a space for housing the forward-extending portion of the lower edge of the rotator closer to the front of the vehicle extending more forward than the edge of the heat insulating cover closer to the front of the vehicle does. If the upper heat insulating cover and the lower heat insulating cover are integrally formed with each other, the entire heat insulating cover is rotated, and thus, the lower edge of the heat insulating cover closer to the front of the vehicle extends relatively forward in the longitudinal direction of the vehicle.

In contrast, if the heat insulating cover is divided into the upper and lower heat insulating covers, and the upper heat insulating cover functions as the rotator, the vertical length of the rotator is larger than that in the configuration in which the upper and lower heat insulating covers are integrally formed with each other. This allows, when the rotator is rotated to the open position from the closed position with the rear support as a fulcrum, the extending portion of the rotator (the upper heat insulating cover) that is more forward in the longitudinal direction of the vehicle than the edge of the heat insulating cover closer to the front of the vehicle to be smaller than that in a situation where the upper and lower heat insulating covers are integrally formed with each other. As a result, the space provided in the front of the vehicle can be narrower than that in the situation where the upper and lower heat insulating covers are integrally formed with each other to reduce the size of the heat insulating cover.

Further, according to this configuration, when the upper heat insulating cover is positioned at the closed position, no gap is formed between the lower edge of the upper heat insulating cover and the upper edge of the lower heat insulating cover. This can substantially prevent deterioration of the heat insulating performance of the heat insulating cover due to dividing the heat insulating cover into the upper and lower heat insulating covers.

It is preferable that the attachment structure of the heat insulating cover further include a cowl member disposed, in the engine compartment, rearward of the heat insulating cover in a longitudinal direction of the vehicle, and the rear support be attached to the cowl member.

That is to say, although the engine and the vehicle body vibrate during the operation of the engine, the vibration is generally smaller in the vehicle body than that in the engine. Thus, the rear support is attached to the cowl member that is a part of the vehicle body to easily ensure the durability of the rear support.

It is preferable that the attachment structure of the heat insulating cover in which the rear support is attached to the cowl member further include a radiator shroud disposed forward of the heat insulating cover in the longitudinal direction of the vehicle, and the rotator be supported by an upper portion of the radiator shroud when the rotator is positioned at the closed position.

According to this configuration, the rotator can be supported from both sides in the longitudinal direction of the vehicle. As a result, the rotator is stably supported.

When the rotator is positioned at the closed position, the rotator is supported by the upper portion of the radiator shroud. Thus, during the operation of the engine, the vibration applied to the rear support and the vibration applied to the upper portion of the radiator shroud are both transmitted from the vehicle member. This allows the magnitude of the vibration applied to the rear support to be substantially consistent with that of the vibration applied to the upper portion of the radiator shroud. Therefore, this can substantially prevent generation of torsion of the rotator caused by the difference between the magnitude of the vibration applied to the rear support and the magnitude of the vibration applied to the upper portion of the radiator shroud. As a result, the durability of the rotator can be ensured.

Advantages of the Invention

As can be seen from the foregoing, the attachment structure of the heat insulating cover of the present disclosure includes the rear support provided in the portion of the heat insulating cover closer to the rear of the vehicle, and vertically rotatably supporting the upper portion of the heat insulating cover including the entire top wall. In addition, the upper portion of the heat insulating cover including the entire top wall functions as a rotator configured to be rotated, with the rear support as a fulcrum, between the closed position where the engine is shielded from above, and the open position where the top surface of the engine is visible from the position in front of the vehicle and the position above the vehicle. This allows for performing the maintenance of the engine without detaching the entire heat insulating cover from the vehicle body and without providing, e.g., an opening for the engine maintenance in the heat insulating cover. This allows for improving work efficiency in the maintenance of the engine without deteriorating heat insulating performance of the heat insulating cover.

DESCRIPTION OF EMBODIMENTS

An embodiment of the present disclosure will now be described in detail with reference to the drawings.

Figure 1:
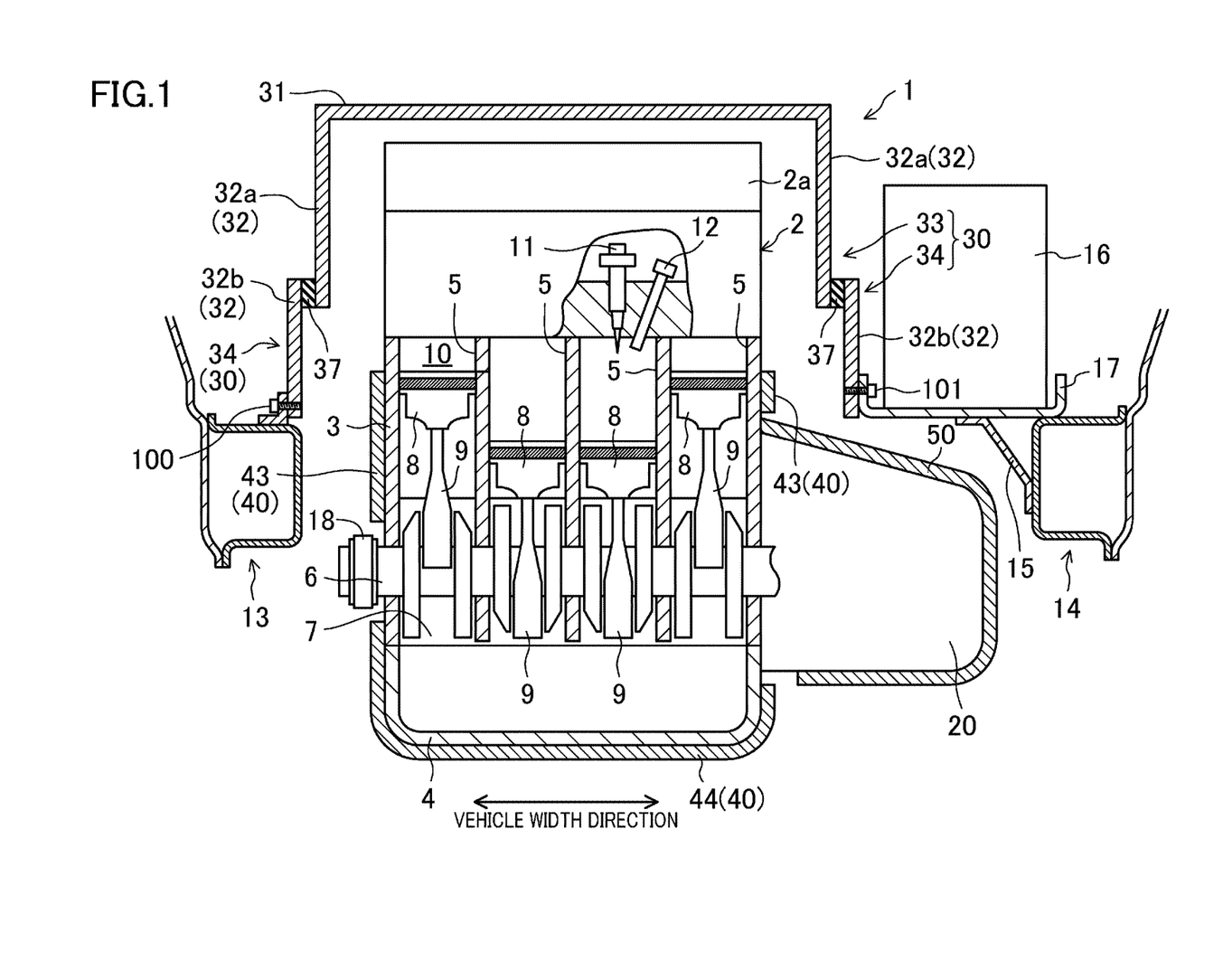
FIG. 1 is a schematic diagram of an engine covered with a heat insulating cover adjacent to a cylinder head (hereinafter referred to as "cylinder-head-side heat insulating cover"), the cylinder-head-side heat insulating cover being attached by an attachment structure according to an embodiment of the present disclosure.

FIG. 1 is a cross-sectional view of a multi-cylinder engine (hereinafter referred to as "engine 1") having a heat insulating cover attached by an attachment structure according to an embodiment. This engine 1 is horizontally disposed in an engine compartment in the front of the vehicle such that the cylinder bank direction coincides with the vehicle width direction (the lateral direction in FIG. 1). That is to say, the engine 1 is a transverse engine. This engine 1 is disposed in the front of the vehicle, with the upper portion of the engine 1 slanted toward the rear side of the vehicle. A bonnet 80 is disposed above the engine 1 with the engine 1 mounted in the front of the vehicle (see FIG. 5).

The engine 1 is comprised of a cylinder head 2, a cylinder block 3, and an oil pan 4 which are arranged vertically in this order and coupled together. In the following description, a side adjacent to the cylinder head 2 will be referred to as "upper side," and a side adjacent to the oil pan 4 will be referred to as "lower side."

In the upper portion of the cylinder block 3, four cylinders 5 are arranged in a single row to form a cylinder bank. In the lower portion of the cylinder block 3, a crankcase 7 in which a crankshaft 6 is disposed is formed.

A piston 8 is inserted into each of the cylinders 5 to be slidable in the inner periphery of each of the cylinders 5. The piston 8 is coupled to the crankshaft 6 through a connecting rod 9. A combustion chamber 10 is provided in each cylinder 5 (only one is illustrated in FIG. 1), i.e., is defined by a top surface of the piston 8, the inner wall surface of the cylinder 5, and the bottom surface of the cylinder head 2.

The cylinder head 2 is provided with, for each cylinder 5, an intake port (not illustrated) for introducing fresh air into the combustion chamber 10, and an exhaust port (not illustrated) for discharging exhaust gas from the combustion chamber 10. The cylinder head 2 is also provided with an inlet (not illustrated) and an outlet (not illustrated) for allowing the intake and exhaust ports to communicate with the combustion chamber 10. The cylinder head 2 is further provided with an intake valve (not illustrated) and an exhaust valve (not illustrated) which are configured to open/close the inlet and the outlet, and is further provided with a valve opening/closing mechanism (not illustrated) for opening/closing the intake and exhaust valves.

An intake manifold (not illustrated) disposed in a portion of the engine 1 adjacent to the front of the vehicle is connected to the intake port. An exhaust manifold (not illustrated) disposed in a portion of the engine 1 adjacent to the rear of the vehicle is connected to the exhaust port.

The cylinder head 2 is provided with a fuel injection valve 11 and an ignition plug 12 for each cylinder 5 (only one valve and one plug are illustrated in FIG. 1). The fuel injection valve 11 injects fuel into the combustion chamber 10, and the ignition plug 12 ignites the fuel injected into the combustion chamber 10 by the fuel injection valve 11.

A head cover 2a is attached to the top of the cylinder head 2.

The oil pan 4 stores oil which is supplied to, e.g., a bearing metal (not illustrated) of the crankshaft 6, and the valve opening/closing mechanism such as a hydraulic valve opening/closing mechanism. Although not illustrated, an oil pump is disposed in the lower portion of the cylinder block 3 to supply oil to each component of the engine 1.

A transmission 20 is coupled to one side of the engine 1 in the cylinder bank direction (on the left of the vehicle (on the right of FIG. 1) in this embodiment). The engine 1 and the transmission 20 constitute a power plant. The transmission 20 is an automatic transmission in this embodiment, and has a transmission mechanism such as a torque converter (not illustrated) in a transmission case. The transmission 20 is horizontally disposed in which input and output shafts, which are not illustrated, extend in the vehicle width direction. The input shaft is coupled to the crankshaft 6 of the engine 1, and the output shaft is coupled to a differential gear (not illustrated) disposed in a side of the transmission 20 adjacent to the rear of the vehicle. Although not illustrated, right and left front-wheel-drive shafts respectively coupled to right and left front wheels extend from the differential gear toward both sides in the vehicle width direction.

The engine 1 is covered with a heat insulating cover 30 adjacent to the cylinder head (heat insulating cover) (hereinafter referred to as "cylinder-head-side heat insulating cover"), and a heat insulating cover 40 adjacent to the cylinder block (hereinafter referred to as "cylinder-block-side heat insulating cover"). Here, with reference to FIGS. 1-5, the configuration of the cylinder-head-side heat insulating cover 30 and the cylinder-block-side heat insulating cover 40 will be described.

The cylinder-head-side heat insulating cover 30 is a heat insulating cover covering an entire head top surface (the top surface of the engine) that is the top surface of the cylinder head 2 (i.e., the top surface of the head cover 2a), the whole of both side surfaces of the cylinder head 2 in the vehicle width direction, and the upper portions of both side surfaces of the cylinder block 3 in the vehicle width direction. The cylinder-block-side heat insulating cover 40 is a heat insulating cover covering the entire cylinder block 3. That is to say, the upper portion of the engine 1 in which the cylinder head 2 is disposed is covered with the cylinder-head-side heat insulating cover 30, and is further covered with a bonnet 80 above the cylinder-head-side heat insulating cover 30. Each of the cylinder-head-side heat insulating cover 30 and cylinder-block-side heat insulating cover 40 is comprised of a fiber material, such as glass wool, having thermal and sound insulation properties. This allows the cylinder-head-side heat insulating cover 30 and the cylinder-block-side heat insulating cover 40 not only to heat-insulate the engine 1, but also to substantially prevent engine sound leakage to the outside of the vehicle.

The cylinder-head-side heat insulating cover 30 includes a top wall 31 and first side walls 32 (side walls), as illustrated in FIG. 1. The top wall 31 covers the entire head top surface of the cylinder head 2. The first side walls 32 cover side surfaces of the cylinder head 2 in the vehicle width direction, and upper portions of both side surfaces of the cylinder block 3 in the vehicle width direction.

The top wall 31 faces, and is spaced apart from, the head top surface of the cylinder head 2. Each of the first side walls 32 faces, and is spaced apart from, a corresponding one of the side surfaces of the cylinder head 2 in the vehicle width direction, and faces, and is spaced apart from, a corresponding one of the side surfaces of the cylinder block 3 in the vehicle width direction.

Each of the first side walls 32 is vertically divided into an upper side wall 32*a* and a lower side wall 32*b*. The upper side wall 32*a* covers an upper portion of the corresponding side surface of the cylinder head 2 in the vehicle width direction. The lower side wall 32*b* covers the lower portion of the corresponding side surface of the cylinder head 2 in the vehicle width direction, and the upper portion of the corresponding side surface of the cylinder block 3 in the vehicle width direction.

In other words, each of the first side walls 32 is vertically divided into the upper and lower portions. Thus, the cylinder-head-side heat insulating cover 30 is vertically divided into an upper cylinder-head-side heat insulating cover 33 (an upper heat insulating cover) and a lower cylinder-head-side heat insulating cover 34 (a lower heat insulating cover). The upper cylinder-head-side heat insulating cover 33 is the top wall 31 and the upper side wall 32*a* that is the upper portion of the first side wall 32, the top wall 31 and the upper side wall 32*a* being integrally formed together. The lower cylinder-head-side heat insulating cover 34 is the lower side wall 32*b* that is the lower portion of the first side wall 32.

Figure 5:
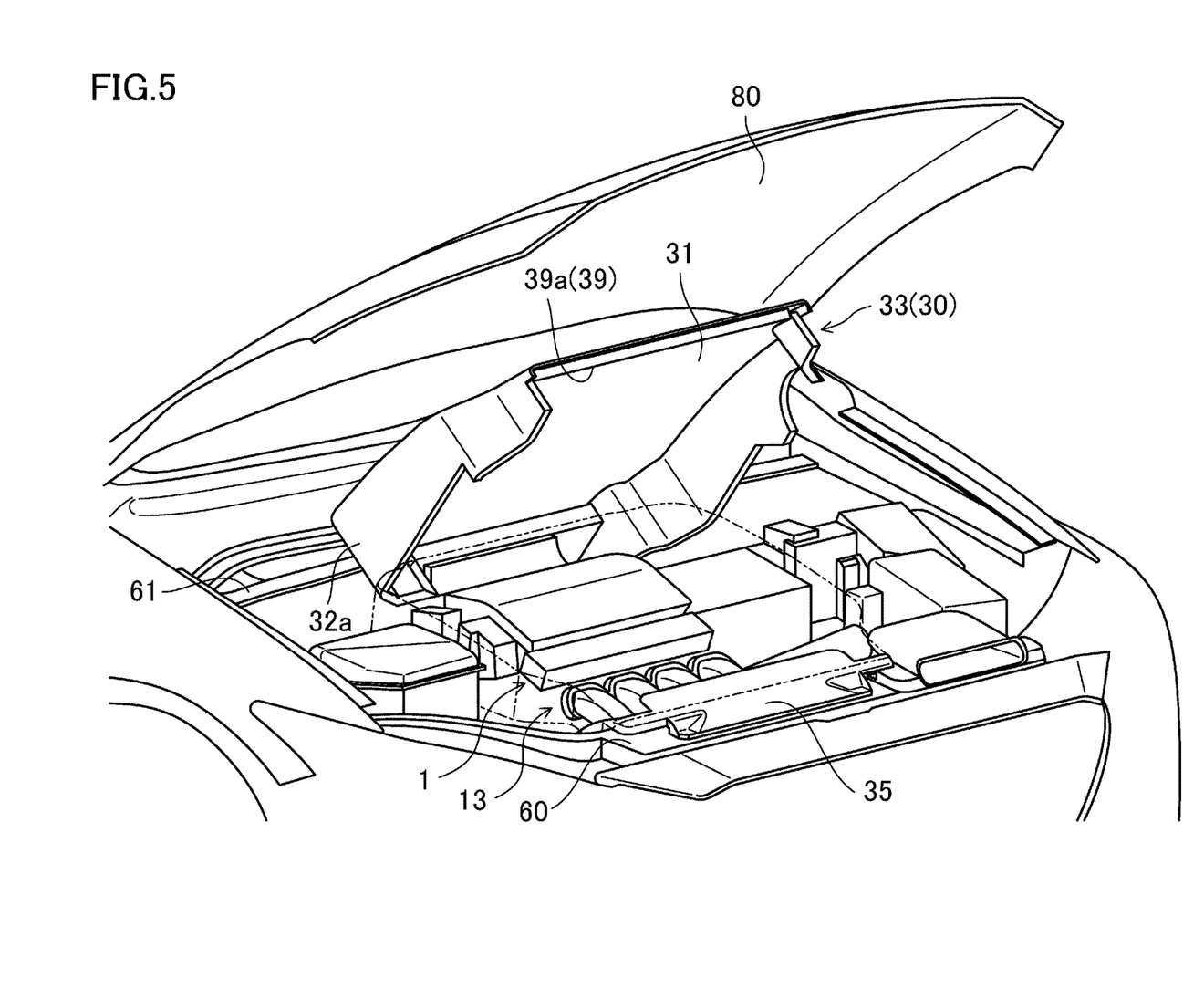
FIG. 5 is a view illustrating close and open positions of an upper cylinder-head-side heat insulating cover with the cylinder-head-side heat insulating cover mounted in a vehicle.

Both edges of the cylinder-head-side heat insulating cover 30 in the longitudinal direction of the vehicle are provided with releasing portions 39 (only a releasing portion 39*a* in the front of the vehicle is illustrated in FIG. 5) with no wall.

Figure 3:
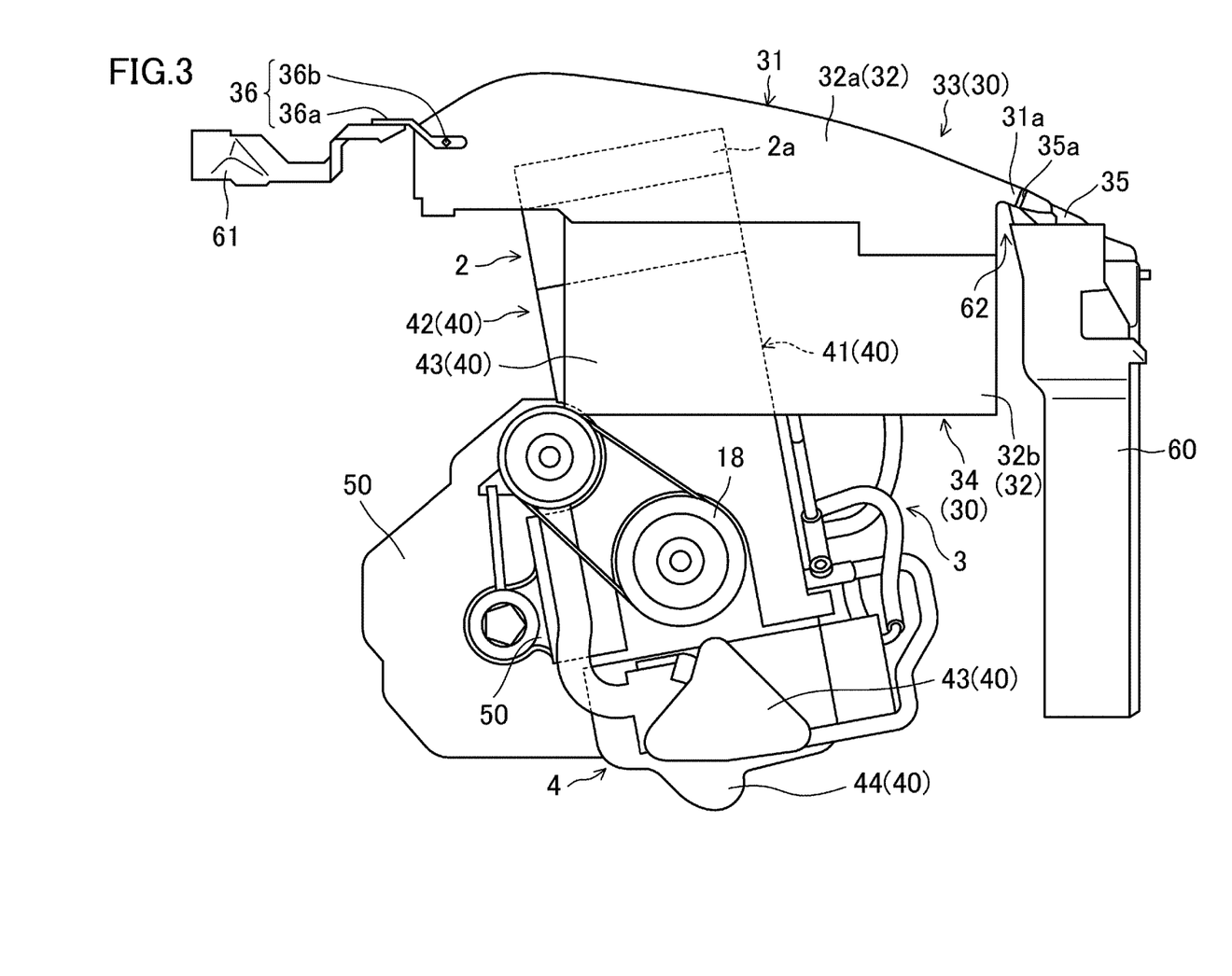
FIG. 3 illustrates a state where the engine is covered with the cylinder-head-side heat insulating cover when viewed from a side away from a transmission.

The top wall 31 of the upper cylinder-head-side heat insulating cover 33, as illustrated in FIG. 3, covers the entire top surface of the cylinder head 2 and components (such as the intake manifold) provided forward of the cylinder head 2 in the longitudinal direction of the vehicle.

Figure 4:
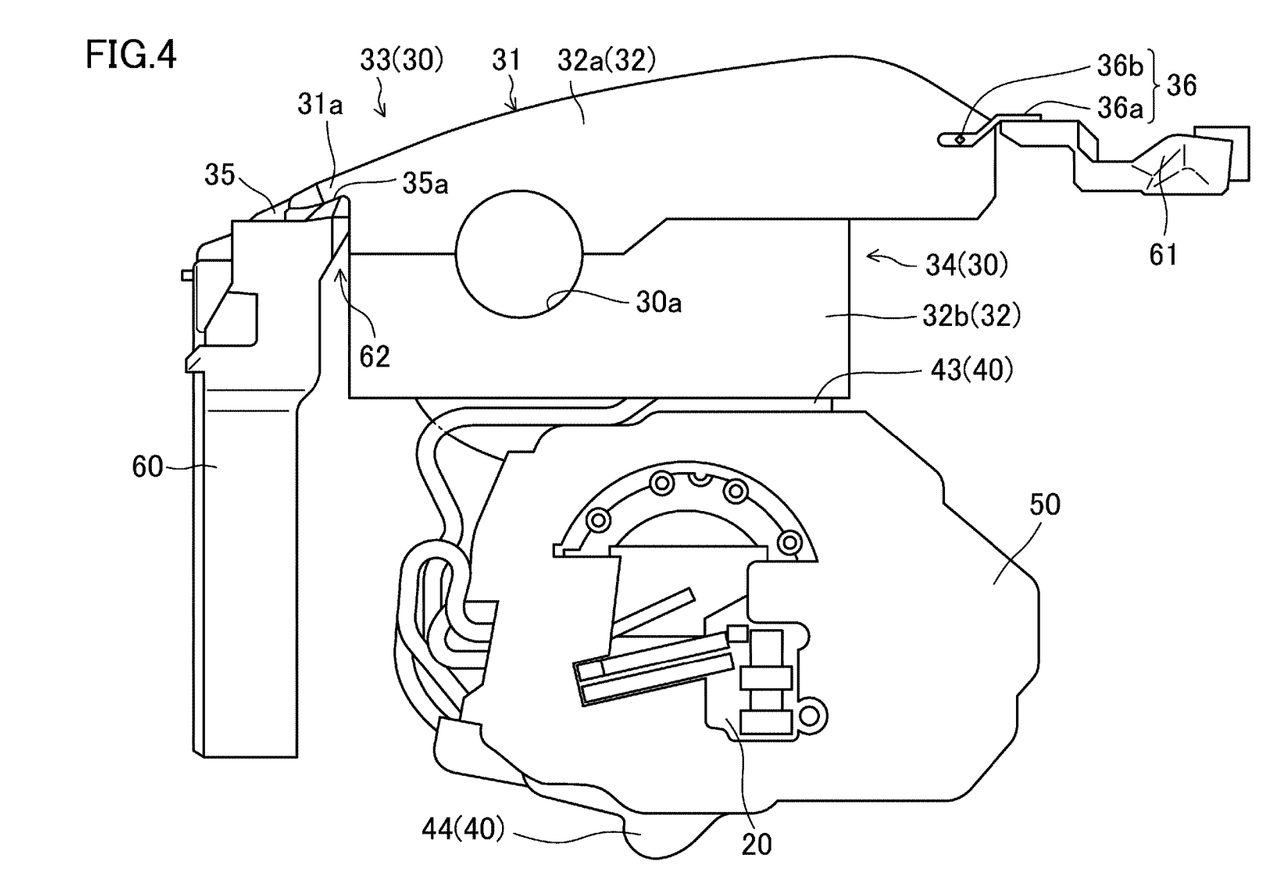
FIG. 4 illustrates the state where the engine is covered with the cylinder-head-side heat insulating cover when viewed from a side adjacent to the transmission.

A radiator shroud 60 is provided forward of the top wall 31 in the longitudinal direction of the vehicle, and are fixed to front side frames 13 and 14 (see FIG. 1). The top wall 31, as illustrated in FIGS. 3 and 4, extends obliquely upward from the location of the radiator shroud 60 toward the rear of the vehicle when viewed from the both sides of the vehicle. The top wall 31 is further curved obliquely downward from a position corresponding to the upstream end of the exhaust manifold in exhaust air (a connection portion between the exhaust manifold and the exhaust port) in the longitudinal direction of the vehicle, and extends to a position near a cowl member 61 coupled to a dash panel. The curved shape of the top wall 31 closer to the rear of the vehicle is approximately adjusted such that headwind entering the vehicle from the releasing portion 39*a* (see FIG. 5) in the front of the vehicle during running of the vehicle flows toward the exhaust manifold and a direct catalyst container (not illustrated) connected to the exhaust manifold.

Further, as illustrated in FIGS. 3 and 4, the top wall 31 is provided such that the edge of the top wall 31 closer to the front of the vehicle protrudes toward the front of the vehicle and is positioned forward of the edge of the upper side wall 32*a* closer to the front of the vehicle in the longitudinal direction of the vehicle. This protrusion (hereinafter referred to as "protrusion 31*a*") is mounted on the front support 35.

As illustrated in FIG. 1, the upper side wall 32*a* of the upper cylinder-head-side heat insulating cover 33 has the upper edge integrally formed with a corresponding one of both edges of the top wall 31 in the vehicle width direction to be integrally formed with the top wall 31, and extends substantially perpendicularly downward from the portion integrally formed with the top wall 31.

Also, as illustrated in FIG. 4, the upper side wall 32*a* on the left in the vehicle width direction has a downwardly open cutout at a portion closer to the rear of the vehicle. This cutout and a cutout formed in the lower side wall 32*b* form a through-hole 30*a*. This through-hole 30*a* is provided to allow, e.g., an intake pipe to extend to the outside of the cylinder-head-side heat insulating cover 30. Although not illustrated, the through-hole 30*a* is sealed after the extension of, e.g., the intake pipe by a cushioning material, such as urethane, having a heat insulating property.

Figure 2:
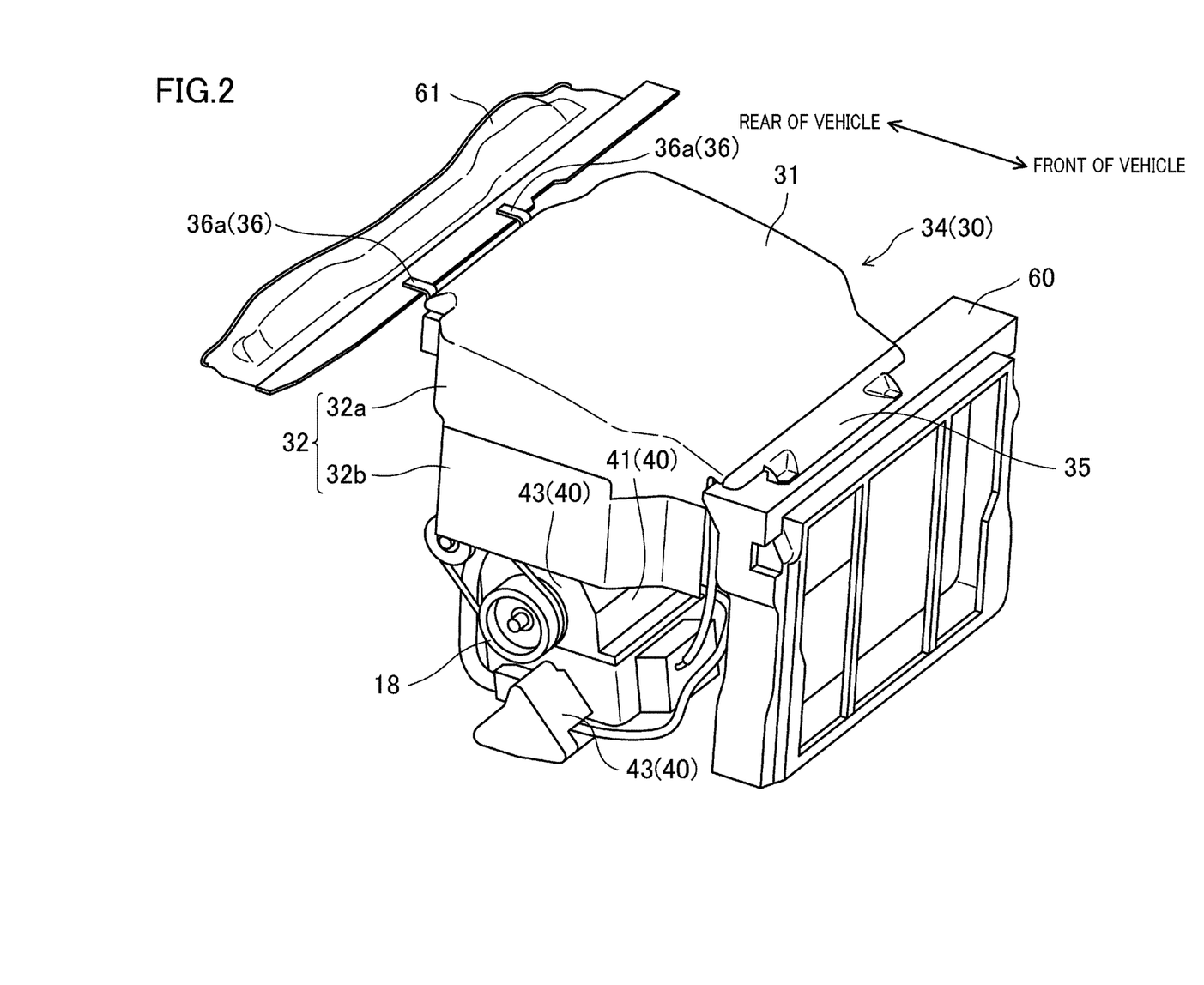
FIG. 2 is a perspective view illustrating the configuration of the cylinder-head-side heat insulating cover.

The upper cylinder-head-side heat insulating cover 33 is supported by vehicle body members near the front and rear of the vehicle, as illustrated in FIGS. 2-4. How the vehicle body members support the upper cylinder-head-side heat insulating cover 33 will specifically be described.

As illustrated in FIG. 2, the top surface of the radiator shroud 60 is provided with the front support 35 supporting the portion of the upper cylinder-head-side heat insulating cover 33 closer to the front of the vehicle. That is to say, the upper cylinder-head-side heat insulating cover 33 is supported on the top portion of the radiator shroud 60 through the front support 35. The front support 35 is detachably fixed to the radiator shroud 60. As described above, the radiator shroud 60 is fixed to the front side frames 13 and 14 (see FIG. 1) constituting a vehicle body member. Thus, the front support 35 is supported by the vehicle body member through the radiator shroud 60. As illustrated in FIGS. 3 and 4, a step part 35*a* is formed in a portion of the front support 35 closer to the rear of the vehicle. The above-described protrusion 31*a* of the top wall 31 is mounted on the step part 35*a*. This allows the front support 35 to support the portion of the upper cylinder-head-side heat insulating cover 33 closer to the front of the vehicle. The top surface of the front support 35 is tilted upward toward the rear side of the vehicle so as to be continuous with the shape of the top surface of the top wall 31 with the protrusion 31*a* mounted on the step part 35*a*.

As illustrated in FIGS. 3 and 4, a space 62 is formed between the radiator shroud 60 and the edge of the upper side wall 32*a*, closer to the front of the vehicle, of the upper cylinder-head-side heat insulating cover 33 with the protrusion 31*a* mounted on the step 35*a* of the front support 35. This space 62 is a space such that the edge of the upper side wall 32*a* closer to the front of the vehicle (in particular, the lower edge of the upper side wall 32*a* closer to the front of the vehicle) does not abut on the radiator shroud 60 when the upper cylinder-head-side heat insulating cover 33 is rotated upward with a hinge mechanism 36, which will be described later, as a fulcrum.

A portion of the upper cylinder-head-side heat insulating cover 33 closer to the rear of the vehicle is provided with hinge mechanisms 36 functioning as a rear support supporting the portion of the upper cylinder-head-side heat insulating cover 33 closer to the rear of the vehicle. As illustrated in FIG. 2, the hinge mechanisms 36 are provided in both sides of the portion of the upper cylinder-head-side heat insulating cover 33 closer to the rear of the vehicle. Each of the hinge mechanisms 36, as illustrated in FIGS. 3 and 4, is comprised of a bracket 36*a* and a pin 36*b*. The bracket 36*a* is fixed to the cowl member 61 that is a vehicle body member disposed backward of the cylinder-head-side heat insulating cover 30 in the longitudinal direction of the vehicle. The pin 36*b* is attached to the bracket 36*a*. Specifically, a portion of each bracket 36*a* closer to the rear of the vehicle is fixed to the cowl member 61 with, e.g., a bolt, and extends toward the rear of the vehicle from the fixed portion in the longitudinal direction of the vehicle. The pin 36*b* is attached to a portion of the bracket 36*a* closer to the front of the vehicle so as to protrude outward of the bracket 36*a* in the vehicle width direction. The portion of the pin 36b protruding outwardly in the vehicle width direction is inserted through the edge of the upper side wall 32a, closer to the rear of the vehicle, of the upper cylinder-head-side heat insulating cover 33. This allows the upper cylinder-head-side heat insulating cover 33 to be rotated vertically with the pin 36b as a fulcrum. With the pin 36b inserted through the edge of the upper side wall 32a closer to the rear of the vehicle, the portion of the upper cylinder-head-side heat insulating cover 33 closer to the rear of the vehicle is supported on the cowl member 61, that is the vehicle body member, by the hinge mechanism 36. That is to say, the hinge mechanism 36 rotatably supports a portion of the cylinder-head-side heat insulating cover 30, specifically, the upper cylinder-head-side heat insulating cover 33 including the entire top wall 31.

The cylinder-head-side heat insulating cover 30 is vertically divided into the upper cylinder-head-side heat insulating cover 33 and the lower cylinder-head-side heat insulating cover 34, and the upper cylinder-head-side heat insulating cover 33 is vertically rotatably supported by the hinge mechanisms 36. This allows the upper cylinder-head-side heat insulating cover 33 to function as a rotator of the cylinder-head-side heat insulating cover 30. This rotator can be rotated, with the pin 36a of the hinge mechanism 36 as a fulcrum, between a closed position where the engine 1 is covered from above to be shielded from above, and an open position where the engine 1 is visible from above.

As illustrated in FIG. 5, when the upper cylinder-head-side heat insulating cover 33 is rotated upward with the pin 36b as a fulcrum, the upper cylinder-head-side heat insulating cover 33 is positioned at the open position where the engine 1 can be viewed from above. In contrast, when the upper cylinder-head-side heat insulating cover 33 is rotated downward from the open position, the upper cylinder-head-side heat insulating cover 33 is positioned at the closed position where the engine 1 is covered from above to be shielded from above, as indicated by the imaginary line in FIG. 5.

As illustrated in FIG. 1, each lower cylinder-head-side heat insulating cover 34 is disposed outwardly of the upper cylinder-head-side heat insulating cover 33 in the vehicle width direction. The upper edge of the lower cylinder-head-side heat insulating cover 34, i.e., the upper edge of the lower side wall 32b is provided with a rubber member 37 extending across the upper edge in the longitudinal direction of the vehicle. The upper cylinder-head-side heat insulating cover 33 (strictly speaking, the upper side wall 32a of the upper cylinder-head-side heat insulating cover 33), when being at the closed position, is configured to abut on the rubber member 37 in the lower cylinder-head-side heat insulating cover 34 (i.e., the lower side wall 32b) from the side of the vehicle. As a result, no gap is formed between the lower edge of the upper cylinder-head-side heat insulating cover 33 and the upper edge of the lower cylinder-head-side heat insulating cover 34, more specifically, between the upper side wall 32a and the lower side wall 32b across the longitudinal direction of the vehicle. This substantially prevents deterioration of heat insulating performance of the cylinder-head-side heat insulating cover 30 due to dividing the cylinder-head-side heat insulating cover 30 into the upper cylinder-head-side heat insulating cover 33 and the lower cylinder-head-side heat insulating cover 34.

The length of the lower cylinder-head-side heat insulating cover 34 in the longitudinal direction of the vehicle is shorter than that of the upper side wall 32a in the longitudinal direction of the vehicle, as illustrated in FIGS. 3 and 4. Specifically, the edge of the lower cylinder-head-side heat insulating cover 34 closer to the front of the vehicle is positioned at substantially the same position as the edge of the upper side wall 32a closer to the front of the vehicle. The edge of the lower cylinder-head-side heat insulating cover 34 closer to the rear of the vehicle is positioned before the edge of the upper side wall 32a closer to the rear of the vehicle in the longitudinal direction of the vehicle. As a result, there is a space behind the edge of the lower cylinder-head-side heat insulating cover 34 closer to the rear of the vehicle, i.e., below the portion of the upper cylinder-head-side heat insulating cover 33 closer to the rear of the vehicle, specifically, below the portion of the upper cylinder-head-side heat insulating cover 33 where the hinge mechanism 36 is attached. As a result, when the upper cylinder-head-side heat insulating cover 33 is rotated from the closed position to the open position by the hinge mechanism 36, such a space is used to allow the upper cylinder-head-side thermal insulation cover 33 near the hinge mechanism 36 to rotate.

The vertical length of the lower cylinder-head-side heat insulating cover 34 is large enough to sufficiently heat-insulate the cylinder head 2. Specifically, when viewed from the side of the vehicle, the vertical length of the lower cylinder-head-side heat insulating cover 34 is large enough to allow the lower portion of the lower side wall 32b to overlap with an upper portion of a corresponding one of second side walls 43, which will be described later.

As illustrated in FIG. 1, the lower cylinder-head-side heat insulating cover 34 in the right of the vehicle is fixed to the front side frame 13 in the right side with a bolt 100, whereas the lower cylinder-head-side heat insulating cover 34 in the left of the vehicle is fixed to a tray 17, that is for a battery 16, fixed to the front side frame 14 in the left side through a bracket 15 with a bolt 101. As a result, the lower cylinder-head-side heat insulating cover 34 is fixed to the vehicle body so as not to move vertically.

The cylinder-block-side heat insulating cover 40 includes, as illustrated in FIG. 3, a front wall 41, a rear wall 42, the second side walls 43, and a bottom 44. The front wall 41 covers a surface of the cylinder block 3 closer to the front of the vehicle. The rear wall 42 covers a surface of the cylinder block 3 closer to the rear of the vehicle. The second side walls 43 cover respective both sides of the cylinder block 3 in the vehicle width direction. The bottom 44 substantially covers the whole of the oil pan 4.

The respective elements 41-44 of the cylinder-block-side heat insulating cover 40 are disposed so as to be substantially in close contact with the surfaces of the cylinder block 3 and the oil pan 4. Specifically, as illustrated in FIG. 3, they are substantially in close contact with the surfaces of the cylinder block 3 and the oil pan 4 while avoiding contacting auxiliary machines, such as a water pump (not illustrated), an alternator (not illustrated), an air compressor (not illustrated), and a timing chain sprocket 18, provided in the cylinder block 3, and a connection between the transmission 20 and the engine 1, as illustrated in FIG. 1.

"Being substantially in close contact" in this context includes not only a state where the cylinder-block-side heat insulating cover 40 adheres to the respective surfaces of the cylinder block 3 and the oil pan 4 without gaps (a state of gapless contact), but also a state where there is such a small gap that headwind that has entered the vehicle and flowed in the engine compartment during running of the vehicle does not flow in the space between the cylinder-block-side heat insulating cover 40 and the cylinder block 3.

The front wall 41, the rear wall 42, and the second side walls 43 of the cylinder-block-side heat insulating cover 40 extend toward upper edges of the respective side surfaces of the cylinder block 3 so as to cover the respective side surfaces. This allows, as illustrated in FIG. 3, the lower portion of the first side wall 32 of the cylinder-head-side heat insulating cover 30, i.e., the lower portion of the lower cylinder-head-side heat insulating cover 34 to overlap vertically with the upper portion of the second side wall 43 of the cylinder-block-side heat insulating cover 40 when viewed from the side of the vehicle.

Although not illustrated, the cylinder-block-side heat insulating cover 40 is bolted to brackets provided in the side surfaces of the cylinder block 3 and the side surfaces of the oil pan 4 to be attached to the respective surfaces of the cylinder block 3 and the oil pan 4.

In this embodiment, as illustrated in FIGS. 1 and 4, the transmission 20 is covered with a cover for heat-insulating the transmission 20 (hereinafter referred to as "transmission heat insulating cover 50").

As well as the cylinder-block-side heat insulating cover 40, the transmission heat insulating cover 50 is disposed so as to be substantially in close contact with the entire surface of the transmission 20 while avoiding contacting, e.g., auxiliary machines connected to the transmission 20.

The transmission heat insulating cover 50 is attached to the transmission 20 with, e.g., a bolt.

In this way, the transmission 20 is covered with the transmission heat insulating cover 50 to heat-insulate the transmission 20. This reduces the viscosity of lubricating oil supplied to, e.g., a torque converter of the transmission 20. This makes it possible to supply a necessary amount of lubricating oil for lubricating, e.g., the torque converter even if the drive force of the oil pump disposed in the transmission 20, driven by the engine 1, and supplying, e.g., the torque converter with lubricating oil is decreased. As a result, the engine output for generating the drive force of the oil pump can be reduced to improve fuel economy. If the transmission 20 is a manual transmission, it is necessary to cool the manual transmission itself with headwind entering the vehicle during running of the vehicle, and thus, it is preferable not to provide the transmission heat insulating cover 50.

Like in this embodiment, the engine 1 is covered with the cylinder-head-side heat insulating cover 30 and the cylinder-block-side heat insulating cover 40 to heat-insulate the engine 1. This can immediately warm the engine 1 in, e.g., a situation where the engine 1 is restarted after a temporary stop of the engine 1, and a situation where the engine 1 is started in a cold state. In this way, immediately warming the engine 1 can reduce an exhaust gas quantity in the engine start.

It is necessary to be able to view the engine 1 during maintenance of the engine 1. As described above, due to the bonnet 80 above the cylinder-head-side heat insulating cover 30, time and effort are required to detach the cylinder-head-side heat insulating cover 30 from the vehicle body so that the cylinder-head-side heat insulating cover 30 does not abut on the bonnet 80 during the maintenance, and to attach the cylinder-head-side heat insulating cover 30 again after the maintenance so that the cylinder-head-side heat insulating cover 30 does not abut on the bonnet 80. Also, a space for storing the detached cylinder-head-side heat insulating cover 30 has to be provided.

However, in this embodiment, the portion of the cylinder-head-side heat insulating cover 30, i.e., the upper cylinder-head-side heat insulating cover 33 including the top wall 31 is rotated upward to the open position with the hinge mechanism 36 (strictly speaking, the pin 36*b* of the hinge mechanism 36) as a fulcrum. This makes it possible to view the engine 1 from above. This allows for performing the maintenance of the engine 1 without detaching the entire cylinder-head-side heat insulating cover 30 from the vehicle body. Also, after the maintenance, the upper cylinder-head-side heat insulating cover 33 is rotated downward with the hinge mechanism 36 (the pin 36*b*) as a fulcrum to be able to cover the engine 1 with the cylinder-head-side heat insulating cover 30 (strictly speaking, the upper cylinder-head-side heat insulating cover 33), again. This allows for improving work efficiency in the maintenance of the engine 1. Also, the cylinder-head-side heat insulating cover 30 does not have to be provided with, e.g., an opening for performing the maintenance (of the engine). As a result, the heat insulating performance of the cylinder-head-side heat insulating cover 30 is not degenerated. Accordingly, work efficiency in the maintenance of the engine 1 can be improved without deteriorating heat insulating performance of the heat insulating cover 30.

The upper cylinder-head-side heat insulating cover 33 can be detached from the lower cylinder-head-side heat insulating cover 34, and the upper cylinder-head-side heat insulating cover 33 can be rotated with the hinge mechanism 36 as a fulcrum. In addition, the lower cylinder-head-side heat insulating cover 34 is fixed so as not to move vertically. Therefore, such a configuration can narrow the space necessary for opening/closing the cylinder-head-side heat insulating cover 30, specifically, the space 62 between the radiator shroud 60 and the edges of the first side walls 32 closer to the front of the vehicle.

Figure 6:
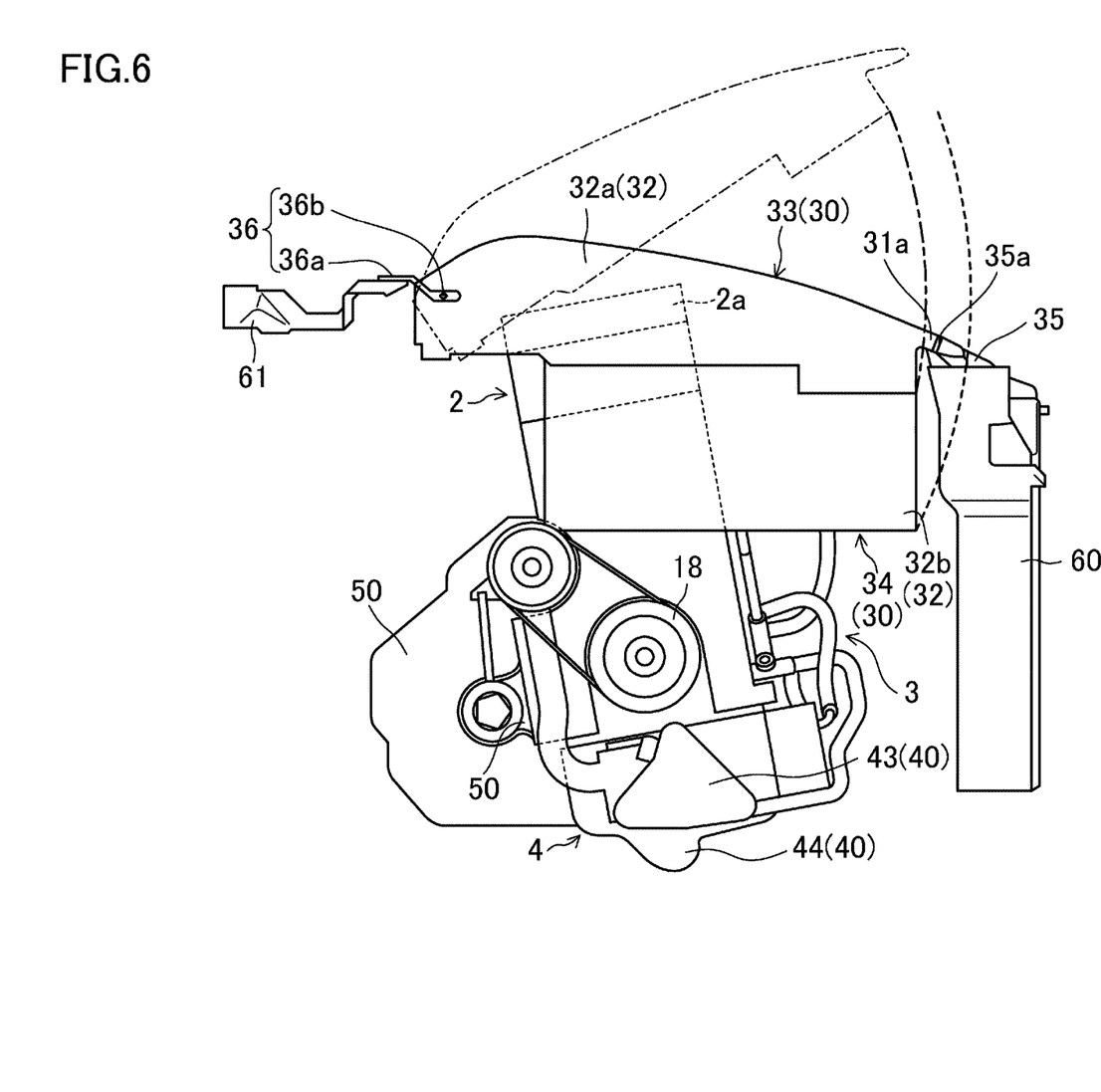
FIG. 6 is a view showing rotation traces of a lower edge of an upper cylinder-head-side heat insulating cover and a lower edge of the entire cylinder-head-side heat insulating cover that are closer to the front of the vehicle when the upper cylinder-head-side heat insulating cover and the entire cylinder-head-side heat insulating cover are rotated by a hinge mechanism.

That is to say, when the rotator in the cylinder-head-side heat insulating cover 30 is rotated with the hinge mechanism 36 as a fulcrum, the lower edge of the rotator closer to the front of the vehicle extends more forward, in the longitudinal direction of the vehicle, than the edge of the cylinder-head-side heat insulating cover 30 closer to the front of the vehicle at its closed position does. It is necessary to provide a space for housing such a forward-extending portion of the lower edge of the rotator closer to the front of the vehicle extending forward of the edge of the cylinder-head-side heat insulating cover 30 closer to the front of the vehicle in the longitudinal direction of the vehicle. If the upper cylinder-head-side heat insulating cover 33 and the lower cylinder-head-side heat insulating cover 34 are integrally formed with each other, the forward-extending portion of the edge of the cylinder-head-side heat insulating cover 30 closer to the front of the vehicle in the longitudinal direction of the vehicle is relatively increased, as indicated by the broken line in FIG. 6. This requires a relatively large space 62 between the radiator shroud 60 and the edge of cylinder-head-side heat insulating cover 30 closer to the front of the vehicle. Otherwise, the cylinder-head-side heat insulating cover 30 abuts on the radiator shroud 60 to narrow the rotation range of the cylinder-head-side heat insulating cover 30.

However, like in this embodiment, in a configuration in which the cylinder-head-side heat insulating cover 30 is divided into the upper cylinder-head-side heat insulating cover 33 and the lower cylinder-head-side heat insulating cover 34, and the upper cylinder-head-side heat insulating cover 33 functions as the rotator, the vertical length of the upper cylinder-head-side heat insulating cover 33 is larger in this configuration than in the configuration in which the upper cylinder-head-side heat insulating cover 33 and the lower cylinder-head-side heat insulating cover 34 are integrally formed with each other. As a result, as indicated by the one-dot-chain line in FIG. 6, when the upper cylinder-headside heat insulating cover 33 is rotated with the hinge mechanism 36 as a fulcrum, the forward-extending portion of the lower edge of the upper cylinder-head-side heat insulating cover 33 closer to the front of the vehicle extending forward, in the longitudinal direction of the vehicle, of the edge of the cylinder-head-side heat insulating cover 30 closer to the front of the vehicle at its closed position, is reduced, compared with the situation where the upper cylinder-head-side heat insulating cover 33 and the lower cylinder-head-side heat insulating cover 34 are integrally formed with each other. Therefore, even if the space 62 between the radiator shroud 60 and the edge of the upper cylinder-head-side heat insulating cover 33 closer to the front of the vehicle is relatively narrowed, the upper cylinder-head-side heat insulating cover 33 does not abut on the radiator shroud 60, and thus, the rotation range of the upper cylinder-head-side heat insulating cover 33 is not narrowed. As a result, this can narrow the space 62 between the radiator shroud 60 and the edge of the upper cylinder-head-side heat insulating cover 33 closer to the front of the vehicle to reduce the size of the structure.

Further, like in this embodiment, if the vertical length of the upper side wall 32a is large enough to cover the upper portion of the side surface of the cylinder head 2 in the vehicle width direction, the sides of the vehicle are not shielded by the upper side wall 32a after the upper cylinder-head-side heat insulating cover 33 is rotated to the open position, as illustrated in FIG. 5. This allows for performing work from sides of the vehicle to further improve work efficiency of the maintenance of the engine 1.

As described above, in this embodiment, the lower portion of the upper cylinder-head-side heat insulating cover 33 is configured to abut on the rubber member 37 in the lower cylinder-head-side heat insulating cover 34 from the sides of the vehicle when the upper cylinder-head-side heat insulating cover 33 is positioned at the closed position. As a result, no space is formed between the upper cylinder-head-side heat insulating cover 33 and the lower cylinder-head-side heat insulating cover 34 across the longitudinal direction of the vehicle. Dividing the cylinder-head-side heat insulating cover 30 into the upper cylinder-head-side heat insulating cover 33 and the lower cylinder-head-side heat insulating cover 34 effectively prevents deterioration of heat insulating performance of the cylinder-head-side heat insulating cover 30.

Further, in this embodiment, the hinge mechanism 36 is fixed to the cowl member 61, and the front support 35 is supported by the vehicle body member through the radiator shroud 60. Thus, during the operation of the engine 1, the vibration applied to the hinge mechanism 36 and the vibration applied to the front support 35 are both transmitted from the vehicle body members. This allows the magnitude of the vibration applied to the hinge mechanism 36 to be substantially consistent with that of the vibration applied to the front support 35. Therefore, this can substantially prevent generation of torsion of the cylinder-head-side heat insulating cover 30, specifically, the upper cylinder-head-side heat insulating cover 33, the torsion being caused by the difference between the magnitude of the vibration applied to the hinge mechanism 36 and the magnitude of the vibration applied to the front support 35. As a result, durability of the cylinder-head-side heat insulating cover 30 (the upper cylinder-head-side heat insulating cover 33 in this embodiment) can be ensured. In general, the vibration of the vehicle body during the operation of the engine 1 is smaller than the vibration of the engine 1. Thus, the hinge mechanism 36 and the front support 35 are supported by the vehicle body member, such that durability of the hinge mechanism 36 and the front support 35 can be easily ensured.

The present disclosure is not limited to this embodiment. Any change can be made within the scope of the claims as appropriate.

For example, in the above embodiment, the cylinder-head-side heat insulating cover 30 is divided into the upper and lower cylinder-head-side heat insulating cover 33 and 34. However, this is merely an example of the present disclosure. The upper and lower cylinder-head-side heat insulating cover 33 and 34 may be integrally formed with each other. In this case, as described above, in order to broaden the rotation range of the cylinder-head-side heat insulating cover 30, it is necessary to provide a space between the radiator shroud 60 and the edge of the cylinder-head-side heat insulating cover 30 closer to the front of the vehicle, the space being large enough to allow the entire cylinder-head-side heat insulating cover 30 to be rotated between the closed position and the open position.

In the above embodiment, the second side walls 43 of the cylinder-block-side heat insulating cover 40 are substantially in close contact with the both side surfaces of the cylinder block 3 in the vehicle width direction. However, this is merely an example of the present disclosure. As long as the second side walls 43 are disposed inward of the first side walls 32 in the vehicle width direction, an interval may be formed between each of the second side walls 43 and the corresponding one of the both side surfaces of the cylinder block 3 in the vehicle width direction. At this time, the interval between each of the second side walls 43 and the corresponding one of the side surfaces of the cylinder block 3 in the vehicle width direction is narrower than an interval between each of the first side walls 32 and the corresponding one of the both side surfaces of the cylinder head 2 in the vehicle width direction, and an interval between the each of the first side walls 32 and the corresponding one of the both side surfaces of the cylinder block 3 in the vehicle width direction.

Further, in the above embodiment, the upper cylinder-head-side heat insulating cover 33 at its closed position is configured to abut on the rubber member 37 of the lower cylinder-head-side heat insulating cover 34 from the side of the vehicle. However, this is merely an example of the present disclosure. As long as a gap is not formed between the lower edge of the upper cylinder-head-side heat insulating cover 33 and the upper edge of the lower cylinder-head-side heat insulating cover 34, the lower edge of the upper cylinder-head-side heat insulating cover 33 may vertically abut on the upper edge of the lower cylinder-head-side heat insulating cover 34. The lower cylinder-head-side heat insulating cover 34 is disposed outwardly of the upper cylinder-head-side heat insulating cover 33 in the vehicle width direction. Alternatively, it may be disposed inwardly of the upper cylinder-head-side heat insulating cover 33 in the vehicle width direction.

The above embodiment is directed to the transverse engine. However, this is merely an example of the present disclosure. The attachment structure of the heat insulating cover according to the embodiment may be applied to a vertical engine in which the cylinder bank direction coincides with the longitudinal direction of the vehicle, and a V-engine in which cylinders are arranged to form a V-shape.

The foregoing embodiment is a merely preferred example in nature, and the scope of the present disclosure should not be interpreted in a limited manner. The scope of the present disclosure is defined by the appended claims, and all variations and modifications belonging to a range equivalent to the range of the claims are within the scope of the present disclosure.

INDUSTRIAL APPLICABILITY

The present disclosure is useful as an attachment structure of a heat insulating cover for heat-insulating an engine disposed in an engine compartment provided in the front of a vehicle, and for covering the engine form above.

DESCRIPTION OF REFERENCE CHARACTERS

1 Engine
30 Cylinder-head-side heat insulating cover (heat insulating cover)
31 Top Wall
32 First Side Wall (Side Wall)
32a Upper Side Wall (Upper Portion of Side Wall)
32b Lower Side Wall (Lower Portion of Side Wall)
33 Upper Cylinder-head-side heat insulating cover (Upper heat insulating cover)
34 Lower Cylinder-head-side heat insulating cover (Lower heat insulating cover)
35 Front Support
36 Hinge Mechanism (Rear Support)
60 Radiator Shroud
61 Cowl Member
80 Bonnet

The invention claimed is:

1. An attachment structure of a heat insulating cover for heat-insulating an engine housed in an engine compartment provided in a front of a vehicle, and closed/opened by a bonnet, wherein
the heat insulating cover includes:
a top wall covering, and spaced apart from, an entire top surface of the engine that is a surface of an upper portion of the engine in a vertical direction; and
side walls integrally formed with the top wall, each of the side walls covering, and spaced apart from, an upper portion of a corresponding one of side surfaces of the engine in a vehicle width direction, and
the attachment structure of the heat insulating cover includes a rear support provided in a portion of the heat insulating cover closer to the rear of the vehicle, and vertically rotatably supporting an upper portion of the heat insulating cover including the entire top wall, and
at least the portion of the heat insulating cover including the entire top wall functions as a rotator capable of being rotated, with the rear support as a fulcrum, between a closed position where the engine is shielded from above, and an open position where the top surface of the engine is visible from a position in front of the vehicle and a position above the vehicle,
the heat insulating cover comprises an upper heat insulating cover including the top wall and an upper portion of the side wall, and a lower heat insulating cover including a lower portion of the side wall, the upper heat insulating cover being detachable from the lower heat insulating cover,
the lower heat insulating cover is attached to a vehicle body of the vehicle,
the upper heat insulating cover is attached to the vehicle body through the rear support, and functions as the rotator, and
when the upper heat insulating cover is positioned at the closed position, the upper heat insulating cover abuts on the lower heat insulating cover such that no gap is formed between a lower edge of the upper heat insulating cover and an upper edge of the lower heat insulating cover.

2. The attachment structure of the heat insulating cover of claim 1, further comprising
a cowl member disposed, in the engine compartment, rearward of the heat insulating cover in a longitudinal direction of the vehicle, wherein
the rear support is attached to the cowl member.

3. The attachment structure of the heat insulating cover of claim 1, further comprising
a cowl member disposed, in the engine compartment, rearward of the heat insulating cover in a longitudinal direction of the vehicle, wherein
the rear support is attached to the cowl member.

4. The attachment structure of the heat insulating cover of claim 3, further comprising
a radiator shroud disposed forward of the heat insulating cover in the longitudinal direction of the vehicle, wherein
the rotator is supported by an upper portion of the radiator shroud when the rotator is positioned at the closed position.

5. An attachment structure of a heat insulating cover for heat-insulating an engine housed in an engine compartment provided in a front of a vehicle, and closed/opened by a bonnet, wherein
the heat insulating cover includes:
a top wall covering, and spaced apart from, an entire top surface of the engine that is a surface of an upper portion of the engine in a vertical direction; and
side walls integrally formed with the top wall, each of the side walls covering, and spaced apart from, an upper portion of a corresponding one of side surfaces of the engine in a vehicle width direction, and
the attachment structure of the heat insulating cover includes a rear support provided in a portion of the heat insulating cover closer to the rear of the vehicle, and vertically rotatably supporting an upper portion of the heat insulating cover including the entire top wall, and
at least the portion of the heat insulating cover including the entire top wall functions as a rotator capable of being rotated, with the rear support as a fulcrum, between a closed position where the engine is shielded from above, and an open position where the top surface of the engine is visible from a position in front of the vehicle and a position above the vehicle,
the attachment structure of the heat insulating cover further comprising;
a cowl member disposed, in the engine compartment, rearward of the heat insulating cover in a longitudinal direction of the vehicle, and
a radiator shroud disposed forward of the heat insulating cover in the longitudinal direction of the vehicle, wherein
the rear support is attached to the cowl member,
the rotator is supported by an upper portion of the radiator shroud when the rotator is positioned at the closed position.

* * * * *